United States Patent
Hewitt et al.

(10) Patent No.: US 10,902,201 B2
(45) Date of Patent: Jan. 26, 2021

(54) DYNAMIC CONFIGURATION OF DOCUMENT PORTIONS VIA MACHINE LEARNING

(71) Applicant: International Business Machines Corporation, Armonk, NY (US)

(72) Inventors: Trudy L. Hewitt, Cary, NC (US); Timothy Brantner, Durham, NC (US); Jana H. Jenkins, Raleigh, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/052,618

(22) Filed: Aug. 2, 2018

(65) Prior Publication Data
US 2020/0042593 A1 Feb. 6, 2020

(51) Int. Cl.
*G06F 40/279* (2020.01)
*G06N 5/02* (2006.01)
*G06N 20/00* (2019.01)
*G06F 40/205* (2020.01)
*G06T 13/80* (2011.01)

(52) U.S. Cl.
CPC .......... *G06F 40/279* (2020.01); *G06F 40/205* (2020.01); *G06N 5/02* (2013.01); *G06N 20/00* (2019.01); *G06T 13/80* (2013.01)

(58) Field of Classification Search
CPC .................................................. G06F 17/2765
USPC ......................................................... 715/220
See application file for complete search history.

(56) References Cited

U.S. PATENT DOCUMENTS

| 9,075,899 B1* | 7/2015 | Reicher | G06F 3/048 |
| 2008/0189238 A1* | 8/2008 | Iyer | G06F 16/22 |
| 2009/0100370 A1 | 4/2009 | Martone et al. | |

(Continued)

OTHER PUBLICATIONS

Gehrmann, Sebastian, Lauren Urke, Ofra Amir, and Barbara J. Grosz. "Deploying AI methods to support collaborative writing: a preliminary investigation." In Proceedings of the 33rd Annual ACM Conference Extended Abstracts on Human Factors in Computing Systems, pp. 917-922. 2015. (Year: 2015).*

(Continued)

*Primary Examiner* — Frank D Mills
(74) *Attorney, Agent, or Firm* — The Steadman Law Firm PLLC

(57) ABSTRACT

Techniques are described relating to dynamic document portion configuration via machine learning. An associated method includes facilitating parsing of a document to identify a plurality of document portions based upon contextual evaluation. The method further includes mining data associated with a client to determine at least one client objective associated with the document and applying at least one artificial intelligence technique of a machine learning knowledge model to the mined data in order to assign a confidence score to each of the plurality of document portions that indicates relevance of the document portion to the at least one client objective. The method further includes identifying a set of document portions among the plurality of document portions having respective confidence scores that exceed a predefined confidence score threshold, and, responsive to the client accessing the document via a user interface of a computing system, configuring the set of document portions.

20 Claims, 10 Drawing Sheets

(56) References Cited

U.S. PATENT DOCUMENTS

| | | | |
|---|---|---|---|
| 2011/0270856 A1* | 11/2011 | Dettinger | G06F 16/382 |
| | | | 707/758 |
| 2012/0151378 A1* | 6/2012 | Parish | G06Q 10/101 |
| | | | 715/751 |
| 2013/0198145 A1* | 8/2013 | Avery | G06F 16/10 |
| | | | 707/687 |
| 2014/0019443 A1* | 1/2014 | Golshan | G06F 16/9535 |
| | | | 707/723 |
| 2014/0189483 A1* | 7/2014 | Awan | H04L 63/08 |
| | | | 715/212 |
| 2014/0289645 A1 | 9/2014 | Megiddo et al. | |
| 2015/0106347 A1 | 4/2015 | McGrew et al. | |
| 2015/0339282 A1* | 11/2015 | Goyal | G06F 17/241 |
| | | | 715/229 |
| 2017/0093644 A1 | 3/2017 | Paul et al. | |
| 2018/0068233 A1* | 3/2018 | Miranda | G06N 20/00 |

OTHER PUBLICATIONS

Show timestamp when cell is changed. Superuser.com, Mar. 6, 2015. [3 pages] <https://superuser.com/questions/886385/show-timestamp-when-cell-is-changed>.

Timestamps in sheets—Google Product Forums. Google Docs Help Form, Jul. 1, 2014. [4 pages] <https://productforums.google.com/forum/#!category-topic/docs/how-do-i/CKkXLYoYipl>.

Automatically Date & Time Stamp Row on Change. OzGrid, Apr. 10, 2008. [4 pages] <https://www.ozgrid.com/forum/forum/help-forums/excel-general/76188-automatically-date-time-stamp-row-on-change?t=88121>.

* cited by examiner

Spreadsheet X

File  Edit  View  Tools  Help

610 — 620 — 622 —

| | A | B | C | D | E |
|---|---|---|---|---|---|
| 1 | Month | Company | Revenue | Expenses | Profit |
| 2 | 2017-01 | Firm A | 13000 | 2000 | 11000 |
| 3 | 2017-02 | Firm A | 9000 | 4000 | 5000 |
| 4 | 2017-03 | Firm A | 10500 | 1000 | 9500 |
| 5 | 2017-04 | Firm B | 12300 | 2200 | 10100 |
| 6 | 2017-05 | Firm B | 11000 | 1600 | 9400 |
| 7 | 2017-06 | Firm C | 8050 | 900 | 7150 |
| 8 | 2017-07 | Firm C | 5000 | 400 | 4600 |
| 9 | 2017-08 | Firm D | 9900 | 1050 | 8850 |
| 10 | 2017-09 | Firm A | 10200 | 1500 | 8700 |
| 11 | 2017-10 | Firm A | 13000 | 3000 | 10000 |

| | A | B | C | D | E |
|---|---|---|---|---|---|
| 1 | Month | Company | Revenue | Expenses | Profit |
| 2 | 2017-01 | Firm A | 13000 | 2000 | 11000 |
| 3 | 2017-02 | Firm A | 9000 | 4000 | 5000 |
| 4 | 2017-03 | Firm A | 10500 | 1000 | 9500 |
| 5 | 2017-04 | Firm B | 12300 | 2200 | 10100 |
| 6 | 2017-05 | Firm B | 11000 | | |
| 7 | 2017-06 | Firm C | 8050 | | |
| 8 | 2017-07 | Firm C | 5000 | | |
| 9 | 2017-08 | Firm D | 9900 | | |
| 10 | 2017-09 | Firm A | 10200 | 1400 | 8800 |
| 11 | 2017-10 | Firm A | 13000 | 3000 | 10000 |

Cell D10 Modification
Author: Client A
Time: 2018-01-02 08:00
Former Value: 1500

FIG. 6B

| | A | B | C | D | E |
|---|---|---|---|---|---|
| 1 | Month | Company | Revenue | Expenses | Profit |
| 2 | 2017-01 | Firm A | 13000 | 2000 | 11000 |
| 3 | 2017-02 | Firm A | 9000 | 4000 | 5000 |
| 4 | 2017-03 | Firm A | 10500 | 1100 | 9400 |
| 5 | 2017-04 | Firm B | 12300 | 2200 | |
| 6 | 2017-05 | Firm B | 11000 | 1( | |
| 7 | 2017-06 | Firm C | 8050 | 9 | |
| 8 | 2017-07 | Firm C | 5000 | 4 | |
| 9 | 2017-08 | Firm D | 9900 | 1050 | 8850 |
| 10 | 2017-09 | Firm A | 10200 | 1400 | 8800 |
| 11 | 2017-10 | Firm A | 13000 | 3000 | 10000 |

Cell D4 Modification
Author: Client A
Time: 2018-01-02 08:23
Former Value: 1000

FIG. 6C

| | A | B | C | D | E |
|---|---|---|---|---|---|
| 1 | Month | Company | Revenue | Expenses | Profit |
| 2 | 2017-01 | Firm A | 13000 | 2000 | 11000 |
| 3 | 2017-02 | Firm A | 9000 | 4000 | 5000 |
| 4 | 2017-03 | Firm B | 10500 | 1100 | 9400 |
| 5 | 2017-04 | Firm B | | | 10100 |
| 6 | 2017-05 | Firm | | | 9400 |
| 7 | 2017-06 | Firm | | | 7150 |
| 8 | 2017-07 | Firm | | | 4600 |
| 9 | 2017-08 | Firm D | 9900 | 1050 | 8850 |
| 10 | 2017-09 | Firm A | 10200 | 1400 | 8800 |
| 11 | 2017-10 | Firm A | 13000 | 3000 | 10000 |

Cell B4 Modification
Author: Client A
Time: 2018-01-02 08:26
Former Value: Firm A

FIG. 6D

| | A | B | C | D | E |
|---|---|---|---|---|---|
| 1 | Month | Company | Revenue | Expenses | Profit |
| 2 | 2017-01 | Firm A | 13000 | 2000 | 11000 |
| 3 | 2017-02 | Firm A | 9000 | 4000 | 5000 |
| 4 | 2017-03 | Firm B | 10500 | 1100 | 9400 |
| 5 | 2017-04 | Firm B | 12300 | 2200 | 10100 |
| 6 | 2017-05 | Firm B | 11000 | 1600 | 9400 |
| 7 | 2017-06 | Firm C | 8050 | 900 | 7150 |
| 8 | 2017-07 | Firm C | 5000 | 400 | 4600 |
| 9 | 2017-08 | Firm D | 9900 | 1050 | 8850 |
| 10 | 2017-09 | Firm A | 10200 | 1400 | 8800 |
| 11 | 2017-10 | Firm A | 13000 | 3000 | 10000 |

SHOW MODIFICATIONS

FIG. 6E

DYNAMIC CONFIGURATION OF DOCUMENT PORTIONS VIA MACHINE LEARNING

BACKGROUND

The various embodiments described herein generally relate to dynamic document portion configuration via machine learning. More specifically, the various embodiments describe techniques of dynamically configuring a set of document portions through application of artificial intelligence via a machine learning knowledge model.

Conventional applications may permit configuration of an entire document or contiguous, static portions thereof. Such conventional application configuration may require constant communication among various clients and/or constant communication between a client and a server, particularly with respect to document access control or document modification tracking.

SUMMARY

The various embodiments described herein provide techniques of dynamic document portion configuration. According to an embodiment, an associated method includes facilitating parsing of a document, via a natural language processing application, to identify a plurality of document portions based upon contextual evaluation. The method further includes mining data associated with a client to determine at least one client objective associated with the document and applying at least one artificial intelligence technique of a machine learning knowledge model to the mined data in order to assign a confidence score to each of the plurality of document portions that indicates relevance of the document portion to the at least one client objective. The method further includes identifying a set of document portions among the plurality of document portions having respective confidence scores that exceed a predefined confidence score threshold. The method further includes, responsive to the client accessing the document via a user interface of a computing system, configuring the set of document portions. Optionally, the method further includes, responsive to the client exiting the document via the user interface, updating a knowledge base of the machine learning knowledge model based upon activity of the client. In an embodiment, at least one of the plurality of document portions includes noncontiguous sections. In a further embodiment, assigning a confidence score to each of the plurality of document portions includes considering predefined criteria.

In an embodiment, the step of mining data associated with the client includes analyzing historical data associated with the client to identify data pertaining to any historical contextual relationship between the client and one or more topics identified within the document. Additionally, the step of mining data associated with the client includes analyzing current profile data associated with the client to identify data pertaining to any current contextual relationship between the client and the one or more topics identified within the document and analyzing the current profile data associated with the client to identify data pertaining to any potential interest of the client with respect to the document. Moreover, the step of mining data associated with the client includes applying at least one data mining technique to the identified data. In a further embodiment, the step of applying at least one data mining technique to the identified data includes applying at least one data mining algorithm or heuristic via the machine learning knowledge model to associate the identified data with at least one potential client objective. The step of applying at least one data mining technique to the identified data further includes identifying any potential client objective among the at least one potential client objective that exceeds a predefined client objective threshold.

In an embodiment, the step of configuring the set of document portions includes determining access control with respect to one or more of the set of document portions. In addition, the step of configuring the set of document portions includes initiating monitoring of the set of document portions. Moreover, the step of configuring the set of document portions includes, responsive to detecting at least one modification to one or more of the set of document portions, creating metadata with respect to the at least one modification. In a further embodiment, the metadata includes tracking information regarding each of the at least one modification. According to such further embodiment, the tracking information includes at least one aspect selected from the group consisting of modification author, modification timestamp, modification description, and cumulative modification history. Optionally, the step of configuring the set of document portions further includes, responsive to determining that the at least one modification materially affects congruency of at least one document portion among the set of document portions, dynamically modifying the at least one document portion. Moreover, the step of configuring the set of document portions includes facilitating display of at least one visual overlay reflecting the at least one modification in the user interface. In a further embodiment, the step of facilitating display of the at least one visual overlay includes creating at least one animation reflecting any modification among the at least one modification made within a predefined time period.

One or more additional embodiments include a computer program product including a computer readable storage medium having program instructions embodied therewith. According to such embodiment(s), the program instructions may be executable by a computing device to cause the computing device to perform one or more steps of above recited method. One or more further embodiments include a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

FIGS. 6A, 6B, 6C, 6D, and 6E illustrate an interface of a client computing system in an example scenario involving dynamic configuration of a document portion.

DETAILED DESCRIPTION

Figure 1:
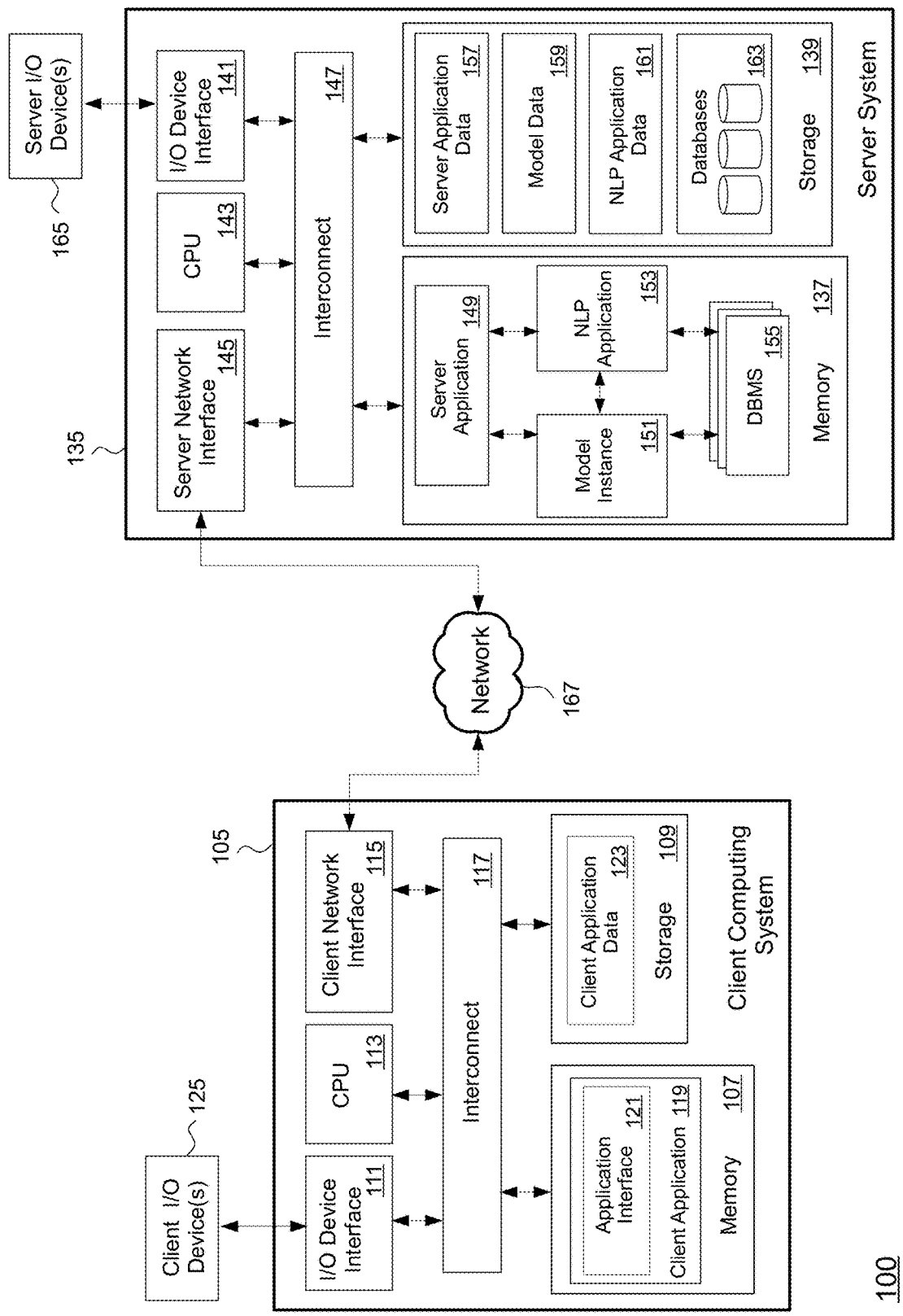
FIG. 1 illustrates a computing infrastructure, according to one or more embodiments.

The various embodiments described herein are directed to techniques of dynamically configuring a set of document portions through application of artificial intelligence via machine learning. A server system configured to implement techniques associated with the various embodiments described herein may utilize artificial intelligence capabilities of a machine learning knowledge model as well as information of a knowledge base associated with the model.

The various embodiments described herein may have advantages over conventional techniques. Specifically, the various embodiments may improve computer technology by dynamically identifying portions of a document relevant to client objectives through application of data mining and artificial intelligence techniques via a machine learning knowledge model. Furthermore, the various embodiments may improve computer technology by facilitating display and configuration in a user interface of a client computing system of identified document portions through selective restriction or control of document access and modification tracking based upon client type, client objective, and/or segregation of duties. The various embodiments may facilitate display in such user interface of an animation reflecting any modification made to the identified document portions within a predefined time period. Additionally, through provision of updates to a knowledge base based upon client activity, the machine learning knowledge model may learn based upon activities resulting from each iteration of document portion configuration. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to dynamic document portion configuration. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. As shown, computing infrastructure 100 includes a client computing system 105 and a server system 135, each connected to a communications network 167. Although shown as a single computing system, server system 135 is included to be representative of a single server system or multiple server systems. In an embodiment, server system 135 includes a single hardware server configured to provide hosting capabilities. In an alternative embodiment, server system 135 includes a plurality of hardware and/or virtualized servers configured to provide hosting capabilities. In a further alternative embodiment, server system 135 is a cloud server system configured to provide distributed hosting capabilities via a plurality of cloud computing nodes in a cloud computing environment. According to such further alternative embodiment, such cloud computing nodes are configured to communicate with one another. Additionally, according to such further alternative embodiment, such cloud computing environment may offer infrastructure, platforms, and/or software as services for which client computing system 105 need not maintain resources locally.

Illustratively, client computing system 105 includes a memory 107, storage 109, input/output (I/O) device interface 111, a central processing unit (CPU) 113, and a client network interface 115, all of which are interconnected via interconnect 117 (e.g., a bus). Although shown as a single computing system, client computing system 105 is included to be representative of a single client or multiple clients. In an embodiment, client computing system 105 is a thin client.

Memory 107 includes a client application 119. Client application 119 may be an online application configured for interfacing with server system 135 and other computing systems. Client application 119 includes an online application interface 121. Application interface 121 includes a graphical user interface (GUI) and/or a command line interface. One or more components of a GUI or command line interface included in application interface 121 may facilitate client input and/or may facilitate display of application data. Storage 109 includes client application data 123 associated with client application 119. I/O device interface 111 is communicatively coupled to one or more client I/O devices 125. CPU 113 is included to be representative of a single CPU, multiple CPUs, a single CPU having multiple processing cores, and the like. Client network interface 115 is configured to receive data from and transmit data to server system 135 via network 167.

As shown in FIG. 1, server system 135 includes memory 137, storage 139, I/O device interface 141, a CPU 143, and a server network interface 145, all of which may be interconnected via interconnect 147 (e.g., a bus). Memory 137 includes a server application 149, a machine learning knowledge model instance 151, a natural language processing (NLP) application 153, and a database management system (DBMS) 155. DBMS 155 is included to be representative of a single database system or multiple database systems. Server application 149 dynamically configures one or more document portions via machine learning according to the various embodiments described herein. In an embodiment, server application 149 facilitates authentication of client computing system 105 and/or other client systems in computing infrastructure 100. In an alternative embodiment, server application 149 sends authentication information associated with client computing system 105 and/or other client systems to an external directory server system, which may in turn perform any necessary authentication steps.

Storage 139 includes server application data 157, model data 159, NLP application data 161, and databases 163. Server application 149 may generate and process server application data 157 based on interaction with client computing system 105. To address requests of client computing system 105, server application 149 may send such requests to model instance 151 or NLP application 153. In an embodiment, model instance 151 sends database requests to DBMS 155, and model instance 151 processes results returned by DBMS 155 to generate model data 159. Moreover, model instance 151 may communicate directly with NLP application 153. In a further embodiment, NLP application 153 sends requests to DBMS 155 to determine one or more language relationships and to generate NLP application data 161. DBMS 155 includes a software application configured to manage databases 163. In an embodiment, databases 163 include one or more relational databases. In an additional embodiment, databases 163 include one or more ontology trees or other ontological structures. While FIG. 1 illustrates three databases 163, server system 135 (and more generally computing infrastructure 100) may include any number of databases. According to a further embodiment, DBMS 155 sends requests to remote databases (not shown) via network 167.

Model instance 151 provides machine learning knowledge model capabilities, e.g., via an artificial intelligence engine. In an embodiment, model instance 151 constitutes the entirety of a machine learning knowledge model. In an alternative embodiment, model instance 151 is a constituent part of a machine learning knowledge model distributed throughout a cloud computing infrastructure or a portion thereof, e.g., a managed services domain within a hybrid cloud computing environment. According to such alternative embodiment, model instance 151 may be configured to communicate with one or more other aspects of the machine learning knowledge model by interfacing with the cloud computing infrastructure. In a further alternative embodiment, model instance 151 is a constituent part of a machine learning knowledge model distributed on multiple server systems. According to such further alternative embodiment, model instance 151 is configured to communicate with one or more other aspects of the machine learning knowledge model by interfacing one or more other server systems on which the machine learning knowledge model is distributed.

In an embodiment, model instance 151 includes one or more aspects of a knowledge base associated with the machine learning knowledge model. The knowledge base may be populated with expert input from subject matter expert(s) and/or via reference materials, such as electronic publications. Furthermore, the knowledge base may be populated based upon past client interaction with server system 135. According to such embodiment, DBMS 155 may coordinate and manage the knowledge base or aspects thereof. In an alternative embodiment, one or more aspects of the knowledge base may be distributed throughout a cloud computing environment or a portion thereof. According to such alternative embodiment, the model instance may be configured to access and/or update the knowledge base by interfacing with the cloud computing infrastructure. In a further alternative embodiment, one or more aspects of the knowledge base may be located in a database server system external to server system 135. Additionally or alternatively, model data 159 may include some or all aspects of the knowledge base.

I/O device interface 141 is communicatively coupled to one or more server I/O devices 165. CPU 143 is included to be representative of a single CPU, multiple CPUs, a single CPU having multiple processing cores, and the like. Server network interface 145 is configured to receive data from and transmit data to client computing system 105 or other client system(s) via network 167. Specifically, server application 149 is configured to accept requests sent by client computing system 105 or other client system(s) to server system 135 and is configured to transmit data to client computing system 105 or other client system(s) via server network interface 145.

Figure 2:
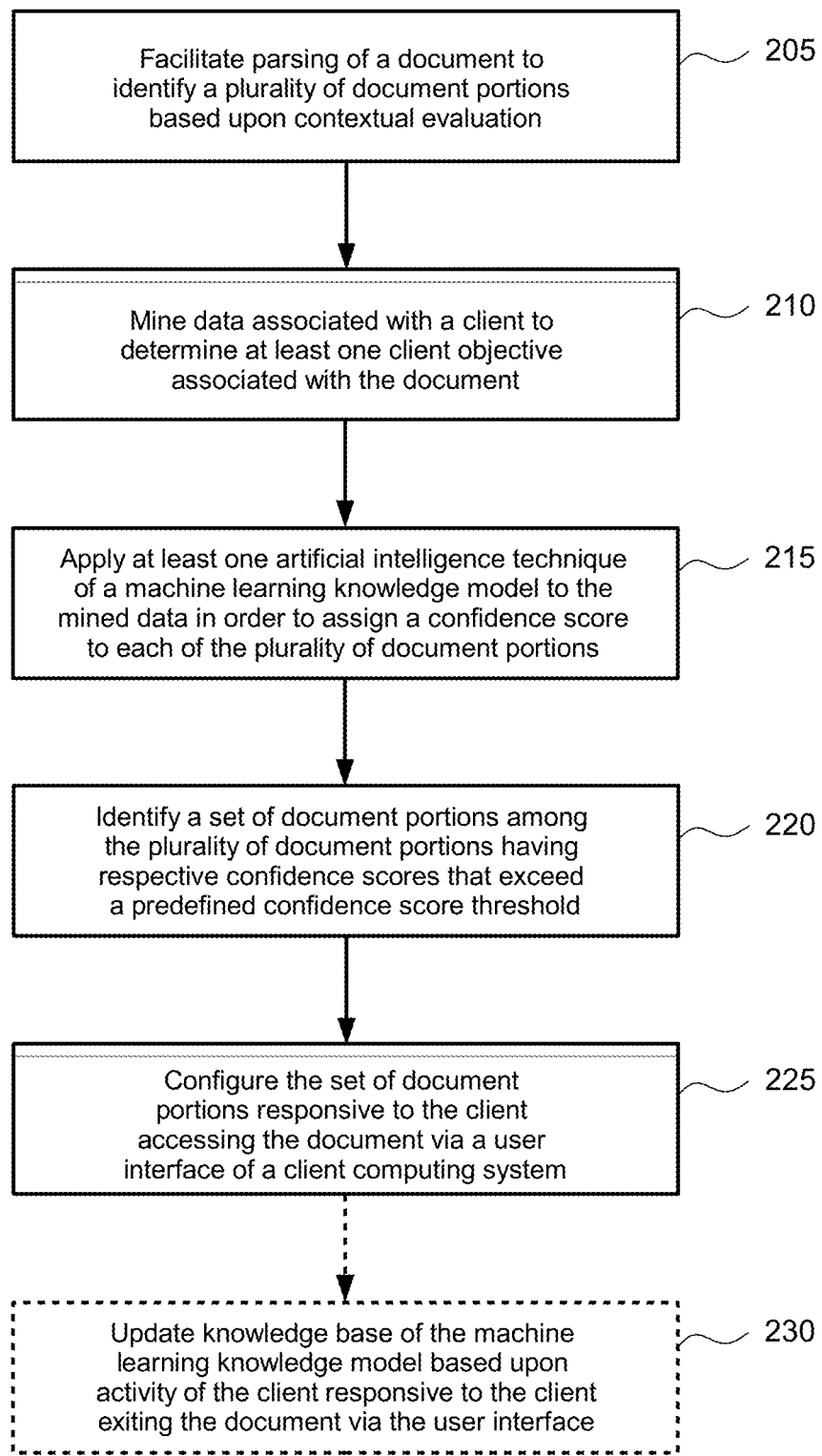
FIG. 2 illustrates a method of dynamically configuring a set of document portions through application of artificial intelligence via a machine learning knowledge model, according to one or more embodiments.

FIG. 2 illustrates a method 200 of dynamically configuring a set of document portions through application of artificial intelligence via a machine learning knowledge model. One or more steps associated with the method 200 and the other methods described herein may be carried out in a client-server computing environment (e.g., computing infrastructure 100). A server application in a server system of the client-server computing environment (e.g., server application 149 in server system 135 of computing infrastructure 100) may facilitate processing according to the method 200 and the other methods further described herein. Additionally or alternatively, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system.

The method 200 begins at step 205, where the server application facilitates parsing of a document to identify a plurality of document portions based upon contextual evaluation. The server system optionally hosts the document. In an embodiment, the server application parses the document via a natural language processing application (e.g., NLP application 153). According to such embodiment, the server application sends the document to the natural language processing application, which may parse the document in order to determine the plurality of document portions and subsequently may return the document portions to the server application. In the context of the various embodiments described herein, a document portion includes at least one section. In the context of the various embodiments described herein, if the document is a textual document, a section may be a spreadsheet cell section, e.g., a collection of spreadsheet cells, or a textual section, e.g., a collection of n-grams. The content of each of the plurality of document portions may vary based upon the contents of the document. For instance, if the document is a spreadsheet or includes a spreadsheet, then one or more of the document portions may include specified spreadsheet cell section(s). In another instance, if the document includes portions of text, such as text of a word processing document or a collection of n-grams, then one or more of the document portions may include specified textual section(s). In a further instance, if the document includes both a spreadsheet cell section(s) and textual section(s), then one or more of the document portions may be a hybrid document portion. In the context of the various embodiments described herein, a hybrid document portion is defined as a document portion including a combination of specified spreadsheet cell section(s) and specified textual section(s). In the context of the various embodiments described herein, a single n-gram is defined as a contiguous sequence of "n" items in a document. Furthermore, in the context of the various embodiments described herein, a collection of n-grams is a plurality of n-grams functioning as a cohesive unit, e.g., a phrase, a sentence, or a paragraph. In an embodiment, the server application facilitates dynamic identification of the plurality of document portions responsive to initially receiving or otherwise accessing the document and/or responsive to determining that the document has been accessed, updated, or otherwise configured. In a further embodiment, in the event of one or more substantial modifications applied to the document, the server application may facilitate an updated parsing of the document to identify a newly updated plurality of document portions in real time.

In an embodiment, at least one of the plurality of document portions includes noncontiguous sections. In the context of the various embodiments described herein, a document portion including noncontiguous sections is defined as including at least two sections that are noncontiguous, i.e., at least two sections that are nonadjacent to one another. In the context of the various embodiments described herein, sections are nonadjacent if they are separated from one another by intervening text, e.g., by at least one intervening section of at least one other document portion. Accordingly, a document portion including noncontiguous sections may include sections that are not consolidated into a single, continuous entity. In one instance, a document portion including noncontiguous sections may include at least two spreadsheet cell sections that are nonadjacent. For example, a document portion is noncontiguous if it includes two spreadsheet cell sections that are nonadjacent consequent to being separated by at least one intervening section (e.g., at least one intervening spreadsheet cell section) of at least one other document portion. In another instance, a document portion including noncontiguous sections may include at least two textual sections that are nonadjacent. For example, a document portion is noncontiguous if it includes two textual sections that are nonadjacent consequent to being separated by at least one intervening section of at least one other document portion, e.g., two paragraphs that are nonadjacent consequent to being separated by at least one intervening section (e.g., at least one intervening paragraph) of at least one other document portion. In a further instance, a hybrid document portion including noncontiguous sections may include at least one spreadsheet cell section and at least one textual section that are nonadjacent. For example, a hybrid document portion is noncontiguous if it includes a spreadsheet cell section and a collection of n-grams that are nonadjacent consequent to being separated by at least one intervening section (e.g., at least one intervening spreadsheet cell section and/or collection of n-grams) of at least one other document portion. In the context of the various embodiments described herein, a document portion including noncontiguous sections is a noncontiguous document portion.

In an embodiment, the server application identifies a plurality of document portions based upon contextual evaluation according to step 205 by associating document aspects according to respective topics. For example, assuming that the document pertains to corporate accounting, the server application may identify all aspects or a designated subset of aspects of the document related to a business expense topic (e.g., quarterly revenue) as within a document portion among the plurality of document portions. In a further embodiment, the server application identifies a plurality of document portions based upon contextual evaluation according to step 205 by associating document aspects according to one or more business relationships, one or more personal relationships, and/or one or more ontological relationships. For instance, the server application may identify document aspects related to corporate employees as within a document portion among the plurality of document portions. According to such example, if the document is a spreadsheet, then the server application may identify all spreadsheet cells or a designated subset of spreadsheet cells within the document including language pertaining to employee data (e.g., employee name or employee attributes) as within a document portion among the plurality of document portions.

At step 210, the server application mines data associated with a client to determine at least one client objective associated with the document. The client may be single user/entity or a group of users/entities. The client may be associated with a client system (e.g., client computing system 105). The mined data may encompass records of past client changes to the document as well as records of client access and/or modifications to similar documents or communications (e.g., client email or other writings). For example, continuing the aforementioned assumption that the document pertains to corporate accounting, client objectives determined by the data mining according to step 210 may include tracking corporate expenditures and analyzing corporate revenue. A method with regard to mining data associated with the client to determine at least one client objective associated with the document in accordance with step 210 is described with respect to FIG. 3.

At step 215, the server application applies at least one artificial intelligence technique of a machine learning knowledge model to the mined data in order to assign a confidence score to each of the plurality of document portions. The confidence score of a document portion indicates relevance of the document portion to the at least one client objective. Specifically, the server application assigns respective confidence scores to each of the plurality of document portions by applying artificial intelligence based decision making and learning capabilities of the machine learning knowledge model. The machine learning knowledge model includes an artificial intelligence engine having access to a knowledge base. The machine learning knowledge model is self-learning and accepts input from various spheres, including implementation feedback, client and/or administrative feedback, and/or system requirements. In an embodiment, an instance of the machine learning knowledge model (e.g., model instance 151) is accessible within the server system. In a further embodiment, the server application applies the at least one artificial intelligence technique to the mined data to create respective contextual mappings between each of the plurality of document portions and the at least one client objective. According to such further embodiment, the confidence score for a given document portion among the plurality of document portions may be a relevance quantification of a contextual mapping between the document portion and the at least one client objective created through the application of the at least one artificial intelligence technique. The confidence score for a given document portion among the plurality of document portions may indicate the likelihood that the document portion may be accessed by the client within a predefined time period given the at least one client objective, i.e., the confidence score may indicate likelihood of projected use of the document portion by the client. In an embodiment, the confidence score may be represented as a percentage or as a decimal number between 0 and 1. For example, continuing the aforementioned assumption that the document pertains to corporate accounting, the server application may create a contextual mapping between a document portion including corporate expense data and a client objective pertaining to tracking corporate expenditures. The server application may calculate a confidence score with respect to the document portion including the corporate expense data, which may quantitatively indicate relative likelihood of projected use by the client. A high confidence score (e.g., a high percentage)

may indicate higher likelihood of projected use, while a low confidence score (e.g., a low percentage) may indicate lower likelihood of projected use.

In an embodiment, the server application assigns a confidence score to each of the plurality of document portions according to step 215 by considering predefined criteria. According to such embodiment, the server application may consider the confidence score criteria through the machine learning knowledge model, e.g., through application of the machine learning knowledge model to knowledge base information relevant to such criteria. The confidence score criteria may be predefined by the client, other client(s), or owner(s) of the document. Confidence score criteria may include at least one aspect selected from the group consisting of historical data associated with the client, current profile data associated with the client, most recent activity of the client, medium or media of historical access by the client (i.e., medium or media via which the client historically has accessed the document and/or similar documents, e.g., via laptop or smartphone), and context of historical access by the client (i.e., context in which the client historically has accessed the document and/or similar documents, e.g., business context and/or personal context). In a further embodiment, the confidence score criteria may be weighted by the client, other client(s), and/or owner(s) of the document. According to such further embodiment, respective weightings of the criteria may be adjustable to determine the relative impact of such criteria upon assigning the confidence score for a given document portion among the plurality of document portions. For instance, respective weightings of the historical data associated with the client and the current profile data associated with the client may be adjusted by the client, other client(s), and/or owner(s) of the document to determine the relative impact of such criteria upon assigning the confidence score for a given document portion among the plurality of document portions.

According to an embodiment, in the event that the server application determines multiple client objectives at step 210, the server application at step 215 assigns a single confidence score representing the multiple client objectives to each of the plurality of document portions. Such single confidence score may account for respective nuances of the multiple client objectives. According to an alternative embodiment, in the event that the server application determines multiple client objectives at step 210, the server application at step 215 assigns a separate confidence score for each of the multiple client objectives to each of the plurality of document portions. According to such alternative embodiment, the server application may consider each of the multiple client objectives separately in the context of the plurality of document portions. For instance, such alternative embodiment may be useful in the event that the multiple client objectives are significantly different in nature, in which case certain document portions may be relatively more relevant to one client objective than to the other client objectives, or vice versa.

In an embodiment, the at least one artificial intelligence technique applied by the server application according to step 215 includes one or more artificial intelligence algorithms. According to such embodiment, one or more artificial intelligence algorithms may include matching algorithms (e.g., string matching algorithms such as a bitmap algorithm or a Levenshtein-type distance algorithm) for purposes of matching similar datasets, in this context matching data related to the at least one client objective with the respective contents of one or more of the plurality of document portions. In another embodiment, the at least one artificial intelligence technique includes application of natural language understanding, which may entail additional processing of the document portions as identified via natural language processing at step 205. In a further embodiment, the at least one artificial intelligence technique includes one or more heuristics. According to such further embodiment, the server application employs one or more heuristics through application of the machine learning knowledge model to assign a confidence score to each of the plurality of document portions. In the context of this embodiment and other embodiments described herein, a heuristic is a machine logic based rule that provides a determination based upon one or more predetermined types of input. Predetermined types of input to various heuristics in the context of assigning confidence score include criteria such as the confidence score criteria previously described and any respective weightings of such criteria. Accordingly, in one example, a heuristic may handle assignment of a confidence score to a document portion among the plurality of document portions according to step 215 by determining how one or more of the criteria and any respective weightings thereof relate to the at least one client objective.

At step 220, the server application identifies a set of document portions among the plurality of document portions having respective confidence scores that exceed a predefined confidence score threshold. In an embodiment, the predefined confidence score threshold is determined and/or is adjustable by the client and/or by other client(s). In a further embodiment, the predefined confidence score threshold is determined and/or is adjustable by owner(s) of the document. In the context of step 220, a lower predefined confidence score threshold may enable relatively more permissive configuration of the plurality of document portions based upon the at least one client objective, while a higher predefined confidence score threshold may enable relatively less permissive configuration of the plurality of document portions based upon the at least one client objective.

In the event that the server application determines multiple client objectives at step 210, identification of the set of document portions at step 220 may vary depending upon how the server application assigns confidence score. In accordance with the aforementioned embodiment in which the server application at step 215 assigns a single confidence score representing multiple client objectives to each of the plurality of document portions, at step 220 the server application identifies the same set of document portions for each of the multiple client objectives. Conversely, in accordance with the aforementioned embodiment in which the server application at step 215 assigns a separate confidence score for each of the multiple client objectives to each of the plurality of document portions, at step 220 the server application may identify a different respective set of document portions for each of the multiple client objectives.

At step 225, responsive to the client accessing the document via a user interface of a client computing system, the server application configures the set of document portions. The server application may configure the set of document portions dynamically, i.e., in real time. The user interface of the client computing system may be an interface of a client application within the client system (e.g., application interface 121 of client application 119). The server application may transmit a copy of the document for display in the user interface of the client computing system. In an embodiment, configuration is client-specific. For example, the server application may configure the set of document portions for the client while configuring a different set of document portions in a distinct manner for other client(s). In another embodiment, in the event that the document is accessed simultaneously by one or more additional clients, the server application may ensure proper synchronization of the plurality of document portions of the document by constantly relaying document updates to both the client and the one or more additional clients upon configuration of one or more of the plurality of document portions (including configuration of the set of document portions according to step 225). Moreover, as further described herein, the server application may ensure proper synchronization of the plurality of document portions through defined access control. Such synchronization may reduce the need for constant client communication and/or constant client-server communication. In a further embodiment, the server application may restrict identification and configuration of the plurality of document portions to a specified area of the document. According to such further embodiment, rather than identifying and configuring document portions throughout the entirety of the document, the client, other client(s) and/or owner(s) of the document may designate a specified area of the document (e.g., upper half of the document) to which identification and configuration of the plurality of document portions may be restricted. In the event that the server application determines multiple client objectives at step 210, at step 225 the server application may configure the respective sets of document portions determined at step 220 for each of the multiple client objectives as a single set of document portions, or alternatively at step 225 the server application may configure the respective sets of document portions determined at step 220 for each of the multiple client objectives separately. A method with regard to configuring the set of document portions in accordance with step 225 is described with respect to FIG. 4.

Optionally, at step 230, responsive to the client exiting the document via the user interface, the server application updates the knowledge base of the machine learning knowledge model based upon activity of the client. In an embodiment, the server application may submit log data created based upon client activity to the knowledge base. By submitting such log data to the knowledge base, the server application may facilitate tuning of the machine learning knowledge model for future document access by the client and/or other client(s). The machine learning knowledge model may utilize new log data created based upon client activity in order to apply artificial intelligence based decision making and learning capabilities that are more customized to the at least one client objective and/or the objective(s) of other client(s) during any future client access scenario.

Figure 3:
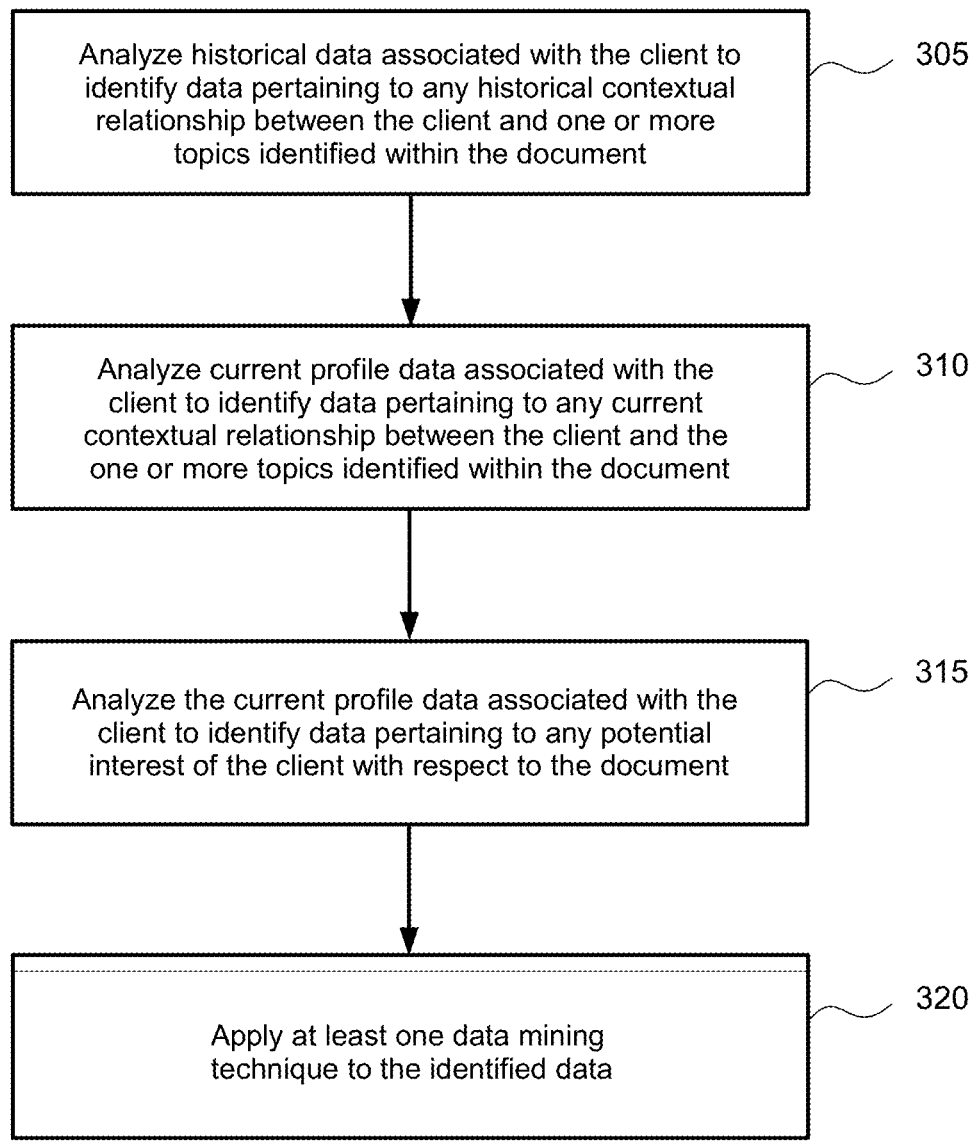
FIG. 3 illustrates a method of mining data associated with a client to determine at least one client objective associated with a document, according to one or more embodiments.

FIG. 3 illustrates a method 300 of mining data associated with the client to determine the at least one client objective associated with the document. The method 300 provides an example embodiment with respect to step 210 of the method 200. The method 300 begins at step 305, where the server application analyzes historical data associated with the client to identify data pertaining to any historical contextual relationship between the client and one or more topics identified within the document. In an embodiment, the historical data reflects the types of topics or data attributes that the client historically has accessed, updated, or otherwise processed in the document or other document(s). In a further embodiment, the historical data reflects past formal (e.g., business) or informal (e.g., personal) relationships that the client had with other client(s). In a further embodiment, the historical data reflects past occupation or education information associated with the client.

At step 310, the server application analyzes current profile data associated with the client to identify data pertaining to any current contextual relationship between the client and the one or more topics identified within the document. At step 315, the server application analyzes the current profile data associated with the client to identify data pertaining to any potential interest of the client with respect to the document. In an embodiment, current profile data in the context of step 310 and/or step 315 includes all or a designated subset of publicly available data associated with the client, including electronically available data such as social networking profile information and/or conversations. In a further embodiment, current profile data includes all or a designated subset of private profile data associated with the client that is accessible by the server system, such as information furnished to the server system by the client or other client(s). In a further embodiment, current profile data includes all or a designated subset of data pertaining to client role, client skills, or client occupation. Such data in certain instances may indicate potential client interest in the context of step 315. For example, such data may indicate that the client is a business customer potentially interested in revenue projections. In another example, such data may indicate that the client is an administrative employee interested in expenses. In a further example, such data may indicate that the client is a student interested in grade information. In a further embodiment, current profile data includes client relationship data. Such client relationship data may indicate potential client interest with respect to other entities in the context of step 315. For instance, a client relationship with a supplier may indicate potential client interest with respect to the supplier's billing history.

At step 320, the server application applies at least one data mining technique to the identified data (i.e., the data identified in the context of steps 305, 310, and 315). In an embodiment, the server application applies respective weights to any identified historical contextual relationship, any identified current contextual relationship, and any identified potential interest to determine how such identified data is considered by the at least one data mining technique. For instance, according to such embodiment, for purposes of data mining the server application is capable of emphasizing historical contextual relationship(s) over current contextual relationship(s), or vice versa. In another instance, according to such embodiment, for purposes of data mining the server application is capable of emphasizing current contextual relationship(s) over potential interest(s), or vice versa. A method with regard to applying at least one data mining technique in accordance with step 320 is described with respect to FIG. 5.

Figure 4:
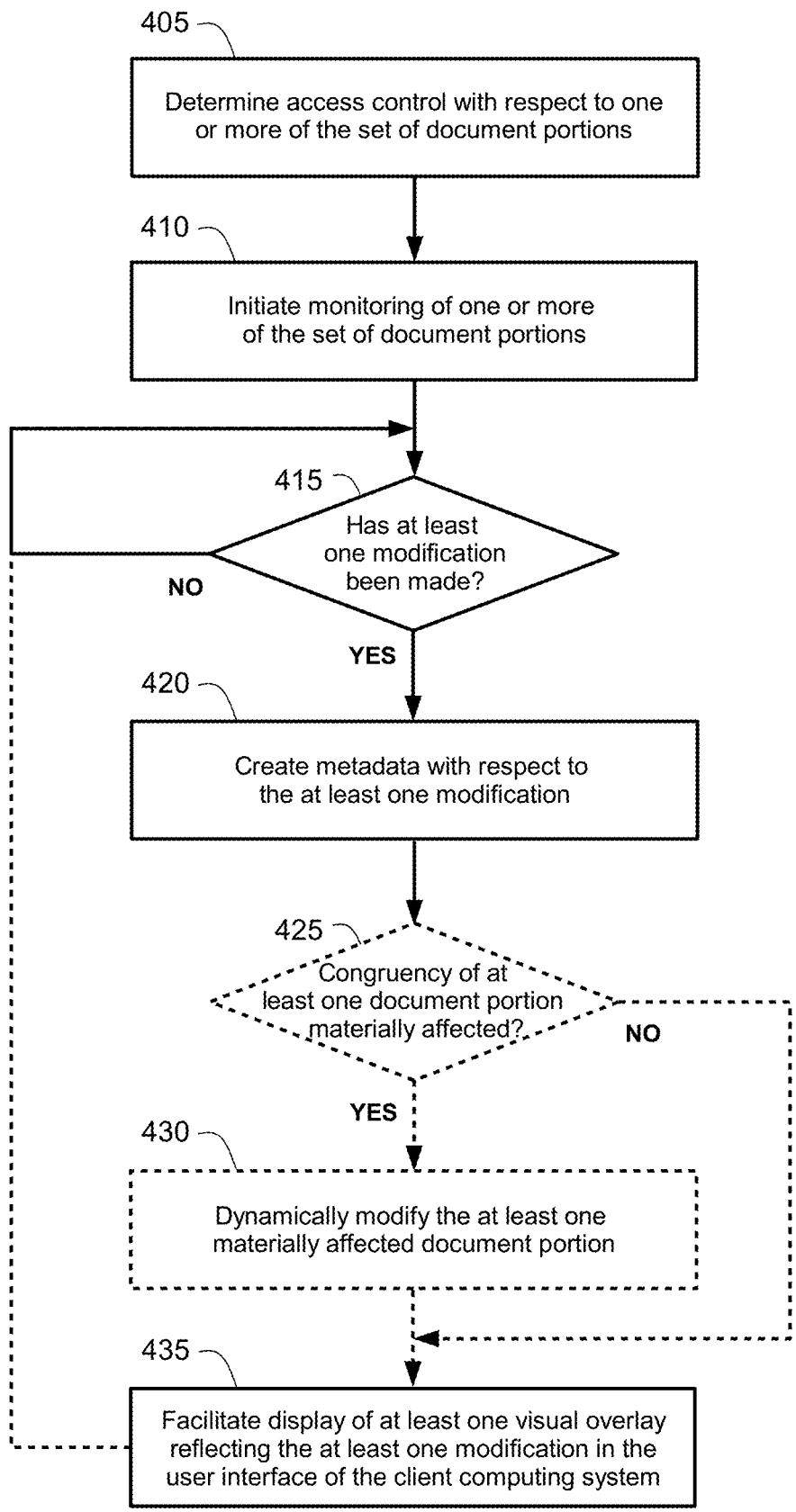
FIG. 4 illustrates a method of configuring a set of document portions, according to one or more embodiments.

FIG. 4 illustrates a method 400 of configuring the set of document portions. The method 400 provides an example embodiment with respect to step 225 of the method 200. The method 400 begins at step 405, where the server application determines access control with respect to one or more of the set of document portions. In an embodiment, the server application determines access control by creating and configuring an access control list with respect to one or more of the plurality of document portions. Accordingly, the server application may regulate access at the document portion level. In an embodiment, the server application regulates or otherwise configures access and/or modification of certain document portion(s) or section(s) thereof for the client and/or other client(s). In a further embodiment, the server application regulates or otherwise configures access and/or modification of certain document portion(s) or section(s) thereof based upon client type, client objective, and/or segregation of duties. For example, the server application may restrict access and/or modification of a document portion pertaining to corporate revenue to client(s) having client profile data that includes a corporate administrative job description. In another example, assuming that client objectives determined according to step 210 include viewing corporate revenue and modifying corporate expenditures, the server application may enable client read and write access for document portion(s) or section(s) thereof pertaining to corporate expenditure but may enable only client read access for document portion(s) or section(s) thereof pertaining to corporate revenue. In a further embodiment, the server application configures or enables configuration of a temporal buffer that restricts or otherwise controls access and/or modification of certain document portion(s) or section(s) thereof to a predefined time period. For example, the server application may configure a temporal buffer that restricts client modifications to document portion(s) pertaining to afternoon business activity to a predefined time period of 12:00 PM through 6:00 PM. According to such further embodiment, the duration of the temporal buffer may be configured by the client, by other client(s), and/or by owner(s) of the document.

At step 410, the server application initiates monitoring of the set of document portions. In an embodiment, server application monitoring is passive in nature, i.e., without active notification(s) to the client with respect to monitoring status. In a further embodiment, server application monitoring is of limited duration. According to such further embodiment, server application monitoring may be limited to a predefined time period by the client, other client(s), and/or owner(s) of the document. Additionally, server application monitoring may be granular at the document portion level, e.g., the server application may monitor one or more document portions in a manner distinct from other document portion(s) and/or for a duration of time distinct from other document portion(s).

At step 415, the server application determines whether at least one modification has been made to one or more of the set of document portions. According to step 415, the server application may identify any modification made by the client or by other client(s). In an embodiment, the server application determines whether at least one modification has been made by passively monitoring in real time subsequent to initiating monitoring at step 410. In an alternative embodiment, the server application determines whether at least one modification has been made by analyzing the document at predetermined periodic intervals subsequent to initiating monitoring at step 410. Responsive to determining that no modification has been made, the server application may repeat step 415.

Responsive to determining that at least one modification has been made, the server application proceeds to step 420, where the server application creates metadata with respect to the at least one modification. The metadata reflects aspect(s) of the at least one modification, such as modification time, modification author, previous data value, modification type, cumulative modification history, and/or document portion(s) affected by the modification. In an embodiment, the metadata is recorded in one or more document activity logs. For instance, there may be a respective document portion activity log for each document portion among the plurality of document portions. In a further embodiment, the metadata created at step 420 includes tracking information regarding each of the at least one modification. According to such further embodiment, the tracking information includes at least one aspect selected from the group consisting of modification author, modification timestamp, modification description, previous data value, and cumulative modification history. In a further embodiment, the server application tracks the at least one modification at the document portion level in addition to or in lieu of the overall document level.

Optionally, at step 425 the server application may determine whether the at least one modification determined in accordance with step 415 materially affects congruency of at least one document portion among the set of document portions. Responsive to determining that the at least one modification does not materially affect congruency of at least one document portion among the set of document portions, the server application may proceed to step 435. Responsive to determining that the at least one modification materially affects congruency of at least one document portion among the set of document portions, optionally at step 430 the server application may dynamically modify (i.e., may modify in real time) the at least one materially affected document portion. In the context of the various embodiments described herein, the at least one modification may materially affect congruency of a given document portion if the modified data no longer is relevant with respect to other data within the given document portion. According to step 430, the server application may dynamically add or delete data from the at least one materially affected document portion. Additionally, according to step 430, the server application may facilitate updating display of the at least one materially affected document portion within the user interface of the client computing system. Furthermore, according to such embodiment, the server application may analyze the metadata created at step 420 with respect to the at least one modification to determine whether one or more of the at least one modification materially affects congruency at step 425. For example, assuming that a document portion includes a spreadsheet cell section pertaining to corporate expenses, upon determining that a spreadsheet cell within the section is modified such that the spreadsheet cell is no longer relevant with respect to the corporate expense data within the section, at step 425 the server application may determine that the modification materially affects congruency of the document portion and accordingly at step 430 may dynamically remove the modified spreadsheet cell from the section. In another example, assuming that a document portion includes a spreadsheet cell section pertaining to a particular firm, upon determining that a spreadsheet cell within the section is modified such that the spreadsheet cell is no longer relevant with respect to the particular firm, at step 425 the server application may determine that the modification materially affects congruency of the document portion and accordingly at step 430 may dynamically modify the section to remove the modified spreadsheet cell (and any corresponding spreadsheet cell(s)). In a related embodiment, responsive to activity on the part of the client or other client(s), e.g., a comment presented by the client, the server application may determine a development affecting congruency of a document portion among the set of document portions and accordingly may modify such document portion based upon the client activity. For example, responsive to insertion of a comment by the client in the user interface of the client computing system indicating desire for removal of a spreadsheet cell that in short time has become obsolete in the context of a document portion, the server application may determine based upon the comment that the obsolescence is a development affecting congruency of the document portion and accordingly may remove the obsolete spreadsheet cell from the document portion based upon the client comment.

At step 435, the server application facilitates display of at least one visual overlay reflecting the at least one modification in the user interface of the client computing system. The at least one visual overlay may enable the client to visually track the at least one modification. The at least one visual overlay optionally reflects the one or more aspects of the metadata created at step 420. For instance, the visual overlay may include a graphical representation of the at least one modification, e.g., a callout box including a textual description of a given modification. In an embodiment, in the event of multiple modifications (e.g., over a period of time), the server application facilitates display of the at least one visual overlay by facilitating display of multiple visual overlays respectively reflecting the multiple modifications. According to such embodiment, the multiple visual overlays optionally may be displayed within a single screen instance of the user interface or within multiple screen instances of the user interface. In an alternative embodiment, in the event of multiple modifications, the server application facilitates display of the at least one visual overlay by facilitating display of a consolidated visual overlay that reflects an aggregation of the multiple modifications.

In an embodiment, e.g., in the event of multiple modifications, the server application facilitates display of the at least one visual overlay by creating at least one animation reflecting any modification among the at least one modification made within a predefined time period. The predetermined time period may be designated by the client, other client(s), and/or owner(s) of the document. The server application may facilitate display of an animation in one or more screen instances of the user interface of the client computing system. Such animation may aid in preserving version control by graphically depicting in succession visual overlays of modifications made to document portion(s) over time, e.g., within the predefined time period. In a further embodiment, e.g., in the event of multiple modifications, the server application facilitates display of a client-selectable interface element in the user interface of the client computing system that pertains to display of an animation of the multiple modifications. According to such further embodiment, upon selection of the client-selectable interface element by the client, the server application may facilitate display via the user interface of an animation including a successive and/or sequential display of visual overlays respectively reflecting all of the multiple modifications or a subset of the multiple modifications. Optionally such sequential display may be repetitive. Such animation may illustrate (optionally on a repeated basis) the succession of modifications made by the client (and optionally by other client(s)) to one or more of the set of document portions of the document. Optionally, the server application may facilitate display of the client-selectable interface element pertaining to animation display responsive to determining that a threshold number of modifications have been made.

Subsequent to display of at least one visual overlay at step 435, the server application optionally returns to step 415, where the server application may determine whether any further modification(s) are made by the client or by other client(s) to the monitored document portion(s) among the set of document portions, e.g., at a time subsequent to modification(s) previously made. FIGS. 6A-6E, further described herein, depict an interface of a client system in an example scenario involving configuration of a document portion, specifically tracking modifications thereof.

Figure 5:
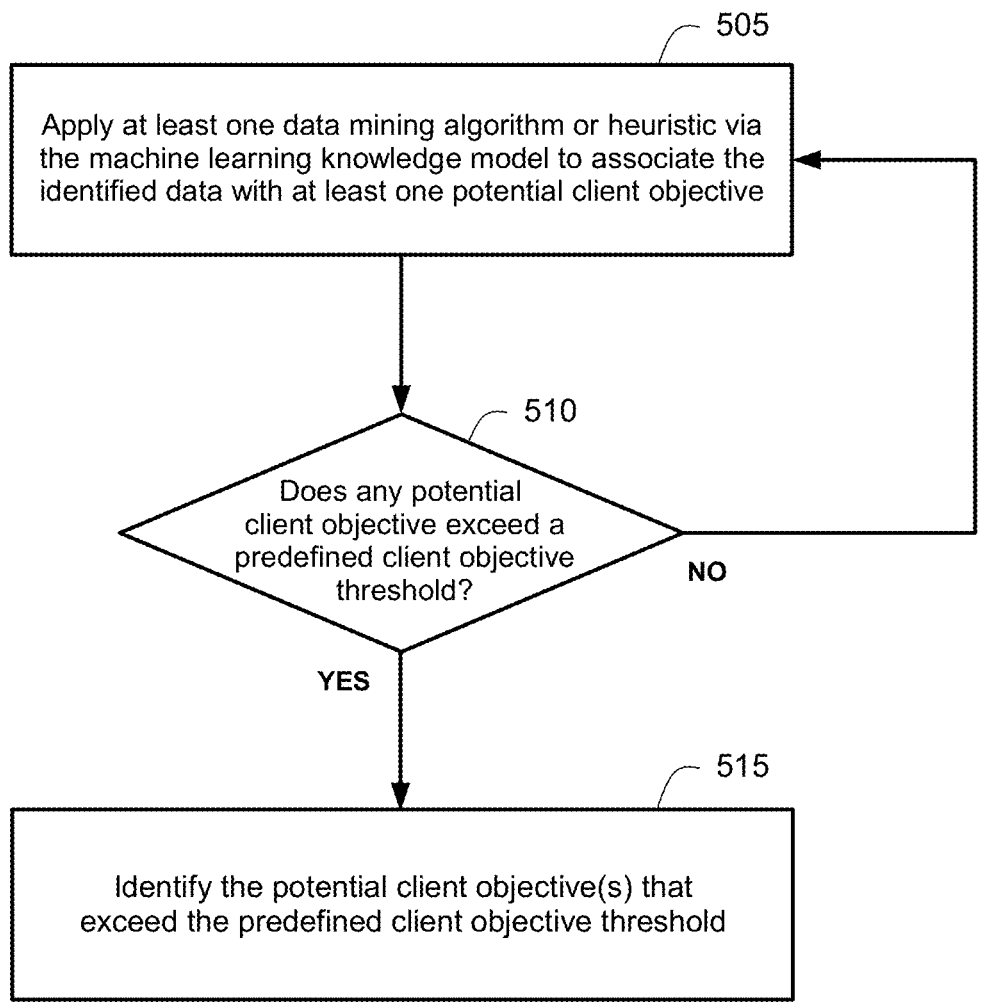
FIG. 5 illustrates a method of applying at least one data mining technique to identified data, according to one or more embodiments.

FIG. 5 illustrates a method 500 of applying at least one data mining technique to the data identified in the context of steps 305, 310, and 315 of the method 300. The method 500 provides an example embodiment with respect to step 320 of the method 300. The method 500 begins at step 505, where the server application applies at least one data mining algorithm or heuristic via the machine learning knowledge model to associate the identified data with at least one potential client objective. In an embodiment, a data mining algorithm may include a decision tree algorithm (e.g., C4.5), a clustering algorithm (e.g., k-means or expectation-maximization), a support vector machine (SVM) algorithm, a naive Bayes algorithm, and/or the Apriori algorithm. In a further embodiment, predetermined types of input to a heuristic in the context of identifying potential client objectives may include previous client objective(s) as reflected within the identified data, previous document(s) accessed by the client, current or previous roles undertaken by the client, and/or previous interaction(s) of the client with other client(s). At step 510, the server application determines whether any potential client objective among the at least one potential client objective exceeds a predefined client objective threshold. The predefined client objective threshold may be designated by the client, other client(s), or owner(s) of the document. Responsive to determining that no potential client objective exceeds a predefined client objective threshold, the server application repeats step 505. In an alternative embodiment, responsive to determining that no potential client objective exceeds a predefined client objective threshold, the server application may apply one or more alternative data mining techniques. Responsive to determining that any potential client objective among the at least one potential client objective exceeds a predefined client objective threshold, at step 515 the server application identifies the potential client objective(s) that exceed the predefined client objective threshold.

In an embodiment, the techniques described herein are applicable to non-textual documents, including photographs and/or audiovisual files. For instance, in the event that the document processed according to the techniques described herein is a photograph, the server application may facilitate parsing of the photograph into a plurality of document portions comprised of one or more sections of pixels. Accordingly, the server application may configure the document portions by configuring the one or more sections of pixels. In another instance, in the event that the document processed according to the techniques described herein is an audiovisual file (e.g., an audio file or a video file), the server application may facilitate parsing of the audiovisual file into a plurality of document portions comprised of one or more sections defined by timeframe. For example, the server application may facilitate parsing of the document to create a document portion comprised of a first section including the first ten minutes of the audiovisual file and a second section including the last ten minutes of the audiovisual file. Accordingly, the server application may configure the document portions by configuring the one or more timeframe sections.

FIGS. 6A-6E illustrate an interface of a client system associated with a Client A in an example scenario involving configuration of a document portion among a plurality of document portions of a document, specifically a spreadsheet, in the context of the methods 200 and 400. The illustrated scenario is merely an example and is not intended to be limiting with respect to document configuration as described herein.

As shown in FIG. 6A, a client system interface 600 includes a spreadsheet 610 (named Spreadsheet X). As shown, in accordance with step 205 the server application may parse spreadsheet 610 into a multiple document portions, including a document portion pertaining to expenses of Firm A (hereinafter referred to as the "Firm A expense document portion"). The Firm A expense document portion, which is highlighted in FIG. 6A, includes spreadsheet cell sections 620, 622, 624, and 626. As illustrated, since sections 620, 622, 624, and 626 are separated by intervening text, more specifically one or more intervening document portions pertaining to Firm B, Firm C, Firm D, revenue, and/or profit, the Firm A expense document portion includes noncontiguous sections and thus is a noncontiguous document portion. In accordance with step 210, the server application may mine data associated with Client A to determine at least one objective of Client A with respect to spreadsheet 610. Assuming that the server application determines that one objective of Client A is to analyze corporate expenses of Firm A, in accordance with step 215 the server application may assign a relatively high confidence score to the Firm A expense document portion with respect to the at least one objective of Client A, since the Firm A expense document portion may be relatively relevant with respect to Client A's objective to analyze corporate expenses. Assuming that the confidence score assigned to the Firm A expense document portion in accordance with step 215 exceeds a predefined confidence score threshold, according to step 220 the server application identifies the Firm A expense document portion as part of a set of document portions of spreadsheet 610 that may be configured by the server application responsive to activity of Client A in accordance with step 225.

As illustrated in FIG. 6B, Client A may modify cell D10 in section 626 of the Firm A expense document portion within spreadsheet 610. Consequent to modifying cell D10, in accordance with step 415 the server application may determine that a modification has been made and consequently may create metadata with respect to the modification to the document according to step 420. Furthermore, in accordance with step 435, to facilitate tracking of the modification, the server application may facilitate display of a visual overlay 630 reflecting the Client A modification to cell D10 in section 626. Visual overlay 630 includes text explicitly describing the modification, including modification author, modification time, and previous cell value. Optionally, visual overlay 630 further may include any additional modification information that may be relevant with respect to spreadsheet 610.

As illustrated in FIG. 6C, Client A further may modify cell D4 in section 622 of the Firm A expense document portion within spreadsheet 610. Consequent to modifying cell D4, in accordance with step 415 the server application may determine that a further modification has been made and consequently may create metadata with respect to the further modification to the document according to step 420. Furthermore, in accordance with step 435, to facilitate tracking of the further modification, the server application may facilitate display of a visual overlay 640 reflecting the Client A modification to cell D4 in section 622. Visual overlay 640 includes text explicitly describing the further modification, including modification author, modification time, and previous cell value. Optionally, visual overlay 640 further may include any additional modification information that may be relevant with respect to spreadsheet 610.

As illustrated in FIG. 6D, Client A further may modify cell B4 in section 620 of the Firm A expense document portion within spreadsheet 610. Consequent to modifying cell B4, in accordance with step 415 the server application may determine that a further modification has been made and consequently may create metadata with respect to the further modification to the document according to step 420. Since the Client A modification to cell B4 changes firm identity from Firm A to Firm B, according to step 425 the server application may determine that the modification materially affects congruency of the Firm A expense document portion, since cell B4 is no longer relevant with respect to Firm A expenses. Thus, in accordance with step 430 the server application may dynamically modify the Firm A expense document portion by removing cell B4 and corresponding cell D4. Consequently, as shown in FIG. 6D, cell B4 is no longer displayed in set 620 of the Firm A expense document portion, and cell D4 is no longer displayed in set 622 of the Firm A expense document portion. Furthermore, in accordance with step 435, to facilitate tracking of the further modification, the server application may facilitate display of a visual overlay 650 reflecting the Client A modification to cell B4. Visual overlay 650 includes text explicitly describing the further modification, including modification author, modification time, and previous cell value. Optionally, visual overlay 650 further may include any additional modification information that may be relevant with respect to spreadsheet 610.

Furthermore, as illustrated in FIG. 6E, the server application may facilitate display of a client-selectable interface element 660 within client system interface 600. Upon selection of client-selectable interface element 660 by Client A, the server application may facilitate display via client system interface 600 of an animation including a successive display of visual overlay 630, visual overlay 640, and visual overlay 650. Such animation may visually illustrate (optionally on a repeated basis) the succession of modifications made by Client A to sections 620, 622, 624, and/or 626 of the Firm A expense document portion of spreadsheet 610.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   facilitating parsing of a document, via a natural language processing application, to identify a plurality of document portions based upon contextual evaluation;
   mining data associated with a client to determine at least one client objective associated with the document;
   applying at least one artificial intelligence technique of a machine learning knowledge model to the mined data in order to assign a confidence score to each of the plurality of document portions that indicates relevance of the document portion to the at least one client objective;
   identifying a set of document portions among the plurality of document portions having respective confidence scores that exceed a predefined confidence score threshold; and responsive to the client accessing the document via a user interface of a computing system, configuring the set of document portions by:
  initiating passive monitoring of the set of document portions;
  determining, based at least in part upon the passive monitoring, at least one modification made to one or more of the set of document portions; and
  dynamically removing data from at least one document portion among the set of document portions upon determining that the at least one modification affects congruency of the at least one document portion with respect to the set of document portions.

2. The method of claim 1, further comprising:
responsive to the client exiting the document via the user interface, updating a knowledge base of the machine learning knowledge model based upon activity of the client.

3. The method of claim 1, wherein at least one of the plurality of document portions includes noncontiguous sections.

4. The method of claim 1, wherein assigning a confidence score to each of the plurality of document portions comprises considering predefined criteria.

5. The method of claim 1, wherein mining data associated with the client comprises:
  analyzing historical data associated with the client to identify data pertaining to any historical contextual relationship between the client and one or more topics identified within the document;
  analyzing current profile data associated with the client to identify data pertaining to any current contextual relationship between the client and the one or more topics identified within the document;
  analyzing the current profile data associated with the client to identify data pertaining to any potential interest of the client with respect to the document; and
  applying at least one data mining technique to the identified data.

6. The method of claim 5, wherein applying at least one data mining technique to the identified data comprises:
  applying at least one data mining algorithm or heuristic via the machine learning knowledge model to associate the identified data with at least one potential client objective; and
  identifying any potential client objective among the at least one potential client objective that exceeds a predefined client objective threshold.

7. The method of claim 1, wherein configuring the set of document portions further comprises determining access control with respect to one or more of the set of document portions, and wherein the passive monitoring of the set of document portions is granular with respect to one or more of the set of document portions.

8. The method of claim 1, wherein configuring the set of document portions further comprises, responsive to detecting the at least one modification, creating metadata with respect to the at least one modification.

9. The method of claim 8, wherein the metadata includes tracking information regarding each of the at least one modification, and wherein the tracking information includes at least one aspect selected from the group consisting of modification author, modification timestamp, modification description, and cumulative modification history.

10. The method of claim 1, wherein configuring the set of document portions further comprises facilitating display of at least one visual overlay reflecting the at least one modification in the user interface.

11. The method of claim 10, wherein facilitating display of the at least one visual overlay comprises creating at least one animation reflecting any modification among the at least one modification made within a predefined time period.

12. A computer program product comprising a computer readable storage medium having program instructions embodied therewith, the program instructions executable by a computing device to cause the computing device to:
  facilitate parsing of a document, via a natural language processing application, to identify a plurality of document portions based upon contextual evaluation;
  mine data associated with a client to determine at least one client objective associated with the document;
  apply at least one artificial intelligence technique of a machine learning knowledge model to the mined data in order to assign a confidence score to each of the plurality of document portions that indicates relevance of the document portion to the at least one client objective;
  identify a set of document portions among the plurality of document portions having respective confidence scores that exceed a predefined confidence score threshold; and
  responsive to the client accessing the document via a user interface of a computing system, configure the set of document portions by:
    initiating passive monitoring of the set of document portions;
    determining, based at least in part upon the passive monitoring, at least one modification made to one or more of the set of document portions; and
    dynamically removing data from at least one document portion among the set of document portions upon determining that the at least one modification affects congruency of the at least one document portion with respect to the set of document portions.

13. The computer program product of claim 12, wherein the program instructions further cause the computing device to:
  responsive to the client exiting the document via the user interface, update a knowledge base of the machine learning knowledge model based upon activity of the client.

14. The computer program product of claim 12, wherein at least one of the plurality of document portions includes noncontiguous sections.

15. The computer program product of claim 12, wherein assigning a confidence score to each of the plurality of document portions comprises considering predefined criteria.

16. The computer program product of claim 12, wherein configuring the set of document portions further comprises determining access control with respect to one or more of the set of document portions, and wherein the passive monitoring of the set of document portions is granular with respect to one or more of the set of document portions.

17. A system comprising:
  a processor; and
  a memory storing an application program, which, when executed on the processor, performs an operation comprising:

facilitating parsing of a document, via a natural language processing application, to identify a plurality of document portions based upon contextual evaluation;

mining data associated with a client to determine at least one client objective associated with the document;

applying at least one artificial intelligence technique of a machine learning knowledge model to the mined data in order to assign a confidence score to each of the plurality of document portions that indicates relevance of the document portion to the at least one client objective;

identifying a set of document portions among the plurality of document portions having respective confidence scores that exceed a predefined confidence score threshold; and responsive to the client accessing the document via a user interface of a computing system, configuring the set of document portions by:
    initiating passive monitoring of the set of document portions;
    determining, based at least in part upon the passive monitoring, at least one modification made to one or more of the set of document portions; and
    dynamically removing data from at least one document portion among the set of document portions upon determining that the at least one modification congruency of the at least one document portion with respect to the set of document portions.

18. The system of claim 17, wherein the operation further comprises:

responsive to the client exiting the document via the user interface, updating a knowledge base of the machine learning knowledge model based upon activity of the client.

19. The system of claim 17, wherein at least one of the plurality of document portions includes noncontiguous sections.

20. The system of claim 17, wherein configuring the set of document portions further comprises determining access control with respect to one or more of the set of document portions, and wherein the passive monitoring of the set of document portions is granular with respect to one or more of the set of document portions.

* * * * *